Figure 1:
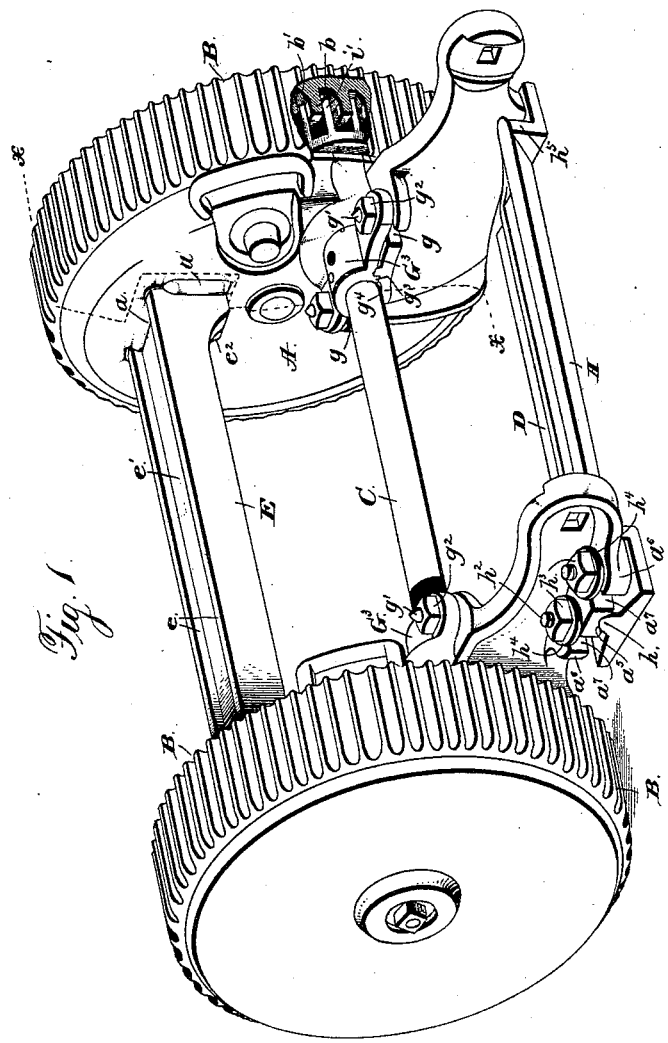

(No Model.)
2 Sheets—Sheet 1.

H. H. DILLE.
LAWN MOWER.

No. 460,433. Patented Sept. 29, 1891.

Witnesses:
Jas. E. Hutchinson
Henry C. Hazard

Inventor.
Henry H. Dille
by Prindle and Russell
his Attorneys (No Model.) 2 Sheets—Sheet 2.
H. H. DILLE.
LAWN MOWER.
No. 460,433. Patented Sept. 29, 1891.
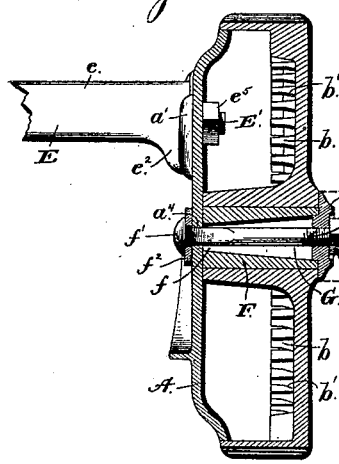
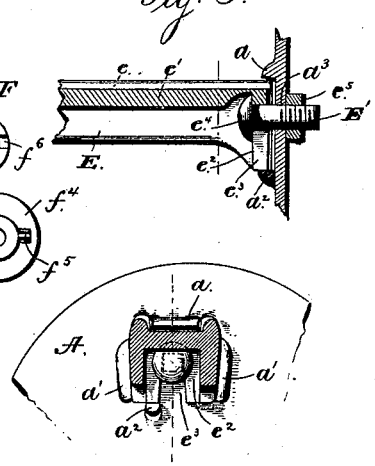
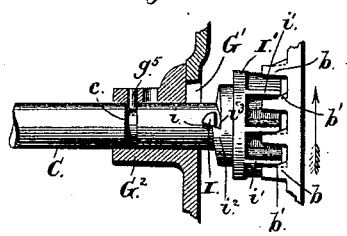
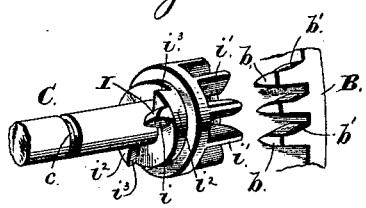
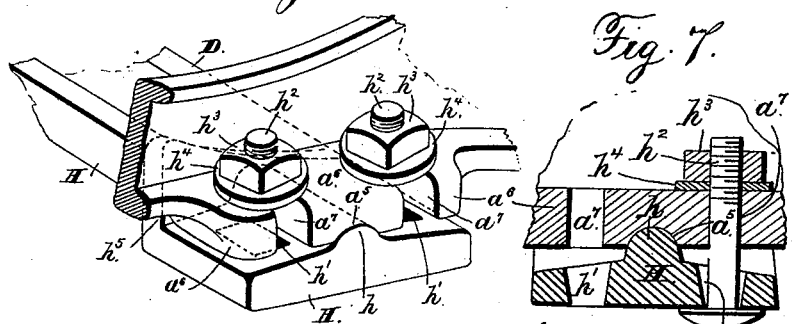
Witnesses:
Jas. E. Hutchinson
Henry C. Hazard
Inventor
Henry H. Dille
by Prindle and Russell
his Attorneys

UNITED STATES PATENT OFFICE.

HENRY H. DILLE, OF RICHMOND, INDIANA.

LAWN-MOWER.

SPECIFICATION forming part of Letters Patent No. 460,433, dated September 29, 1891.

Application filed April 3, 1890. Serial No. 346,434. (No model.)

*To all whom it may concern:*

Be it known that I, HENRY H. DILLE, of Richmond, in the county of Wayne, and in the State of Indiana, have invented certain new and useful Improvements in Lawn-Mowers; and I do hereby declare that the following is a full, clear, and exact description thereof, reference being had to the accompanying drawings, in which—

Figure 1 shows a perspective view of a mower constructed in accordance with my invention. Fig. 2 is a view of a section of one side thereof on the line $x\,x$ of Fig. 1, with certain parts shown in elevation; Fig. 3, a detail view showing one end of the brace and the means for attaching it to the frame-plate; Fig. 4, a detail view showing in rear elevation a portion of the gearing on the drive-wheel and the pinion on the rotary cutter-shaft; Fig. 5, a detail perspective view of a portion of the cutter-shaft with the clutch stud and pinion thereon and the gearing on the drive-wheel; Fig. 6, a detail perspective view, on an enlarged scale, showing the manner and means of adjustably fastening the stationary cutter-bar to the frame-plate; and Fig. 7 is a detail view in section of a portion of the stationary cutter-bar and the frame-plate, showing the construction where they are connected together.

Letters of like name and kind refer to like parts in each of the figures.

The object of my invention is to provide certain improvements in lawn-mowers; and to this end my invention consists in the mower and in the parts thereof constructed, arranged, and combined as hereinafter specified.

The special purpose which I have had in view in making the machine as hereinafter described has been to provide a lawn-mower which shall have its various parts capable of being most easily and cheaply made and readily and securely put together, and which shall be easy and noiseless in action and not liable to get out of order. The parts of the frame for supporting the operative parts and the means for holding such parts in place on the frame I have purposely made so that no drilling or tapping for machine-screws is necessary.

In the drawings, A A designate the side frame-plates, which have, as usual, the main portions to close the inner sides of supporting and driving wheels B B and receive the bearings for the rotary cutter-shaft C, and the extensions or arms for supporting the stationary cutter D, and the ordinary roller or wheels which, resting on the ground, serve to keep the stationary cutter at the desired height above the same. Such roller or wheels I do not show, as they can be of the usual well-known construction, with bearings adjustably or otherwise attached to the frame-plate arms.

While I shall show and describe only one of the wheels B B as adapted to act as a drive-wheel for the rotary cutter-shaft, I desire it to be understood that, if desired, both of such wheels can, without departure from my invention, be made drive-wheels with the same form of gearing and backing-clutch mechanism connecting them with the opposite ends of the rotary shaft.

For rigidly and firmly holding the frame-plates A A in position I provide the cross bar or brace E, which in cross-section has the shape of an H-girder, with the upper portions of the sides or flanges made shorter than the lower portions thereof, so as to form longitudinal ribs $e\,e$, extending along the edges of the upper side of the horizontal part or web $e'$. At or near each end this bar has a vertical portion $e^2$, extending down at right angles to the web $e'$ and provided with a vertical slot $e^3$, preferably open at its lower end. Instead of putting this plate portion $e^2$ at the extreme end of the bar, I find it best to set it slightly back therefrom, as shown in the drawings, so that the ends of the side flanges of the bar shall bear against the frame-plates A A. On the inner side of each of these plates there is a rib $a$ to project between the ribs $e\,e$ and engage them and the upper side of the web $e'$ and the two parallel ribs $a'\,a'$ at right angles to rib $a$ in position to engage the outer sides of the bar when the latter is placed between them, with the top of its web in contact with rib $a$, as thus described; also, on the inner face of each frame-plate A is the short rib or lug $a^2$, adapted to engage the under side of the slotted plate portion $e^2$ when the other ribs are engaging the bar sides and web, as described.

Extending through a hole $a^3$, which need not be drilled, but can be formed, in casting-plate A and slot $e^3$, is the bolt E', having its head $e^4$ engaging the inner side of the bar portion $e^2$ and its outer end provided with a nut $e^5$ to engage the outer side of the frame-plate. With this construction when the nut on the bolt is tightened up the end of bar E will be most firmly and squarely seated against the frame-plate, and is securely held from any sidewise or vertical movement with reference to the latter by the engaging ribs $a\,a'\,a'$ and lug $a^2$.

The axle or journal F, upon which the driving or supporting wheel B is to be supported, I prefer to make separate from the frame-plate, as shown, (see Fig. 2,) in the shape of a hollow cylindrical piece having one end closed, except at its center, where it is provided with a bolt-hole $f$. This end rests against the outer side of the frame-plate, where it is held by the bolt G, which, passing through an opening $a^4$ in said plate, the bolt-hole $f$, and the interior of the axle F, has on its inner end a head $f'$, engaging the inner face of the frame-plate A or a washer $f^2$, resting against such face, and on its outer end has a nut $f^3$, engaging and holding the wheel-retaining plate $f^4$ against the axle end. As usual, this latter plate, for engaging the outer side of the wheel or the end of its hub, has on its inner side the radial lugs or ribs $f^5\,f^5$ to engage notches $f^6\,f^6$ in the outer axle end, so that the wheel cannot rotate it with reference to the axle. With this construction the wheel-receiving axle and the wheel itself can be fixed in place on the frame-plate by the tightening up of the nut on one bolt.

In each frame-plate is formed an opening G' for the passage of the end of the rotary cutter-shaft, and at the lower side of such opening is the fixed half shaft-bearing or journal-box $G^2$, provided with the open-ended slots $g\,g$, respectively, in front and rear of the shaft-receiving concavity. Through such slots and openings in the upper half journal box or cap $G^3$ pass the bolts $g'\,g'$, bearing on their upper ends nuts $g^2\,g^2$ for forcing the cap down in place upon the shaft C. The two half-bearings can be of any desired shape, adapted to properly inclose and hold the shaft. As shown, the upper one has on the rear and front sides of its concavity downwardly-extending ribs $g^3\,g^3$, projecting into corresponding recesses or rabbets $g^4\,g^4$ in the lower half-box. For preventing longitudinal movement of the shaft with reference to its bearings and the driving wheel or wheels either part of the journal-box can be provided with a pin $g^5$, engaging a groove $c$ in the shaft-periphery.

On the under side of the rearward extension or arm on each frame side plate A is a concavity or groove $a^5$, preferably semicircular in cross-section, to receive a correspondingly-shaped longitudinal rib $h$ on the upper side of the end of the stationary cutter-bar H. To the front and rear of this rib the top of the bar end is cut away or inclined downward toward the front and rear bar edge, so that with the rib seated in the groove $a^5$ the bar end can have a rocking motion in a direction at right angles to its length to raise or lower the edge of the cutter with reference to the rotary cutter. The rib-receiving groove $a^5$ extends outward along the side lug $a^6$ on the frame-plate, and in such lug, to the front and rear of the groove, are the slots $a^7\,a^7$, with their outer ends left open, as shown. Passing through such slots and correspondingly-situated bolt-openings $h'\,h'$ in the bar end are the headed bolts $h^2\,h^2$, each provided with a nut $h^3$ and a washer $h^4$, engaged by the nut and itself resting upon the upper side of the lug $a^6$. A shoulder $h^5$ on the bar engages the inner side of the arm or extension of the frame-plate A, so that the bar cannot have longitudinal movement toward one side or the other of the frame, while it is free to be rocked by adjustment of the nuts on the bolts $h^2\,h^2$. The bolt-holes $h'\,h'$ in the ends of the bar H are not drilled or shaped to fit the bolts, but can be, as shown, elongated and made slightly flaring upward for convenience in casting. The elongation of these holes makes possible, also, the connection and separation of the bar ends and frame-plates A A without removal of the nuts $h^3\,h^3$ on the fastening-bolts $h^2\,h^2$, while the flare thereof enables the rocking of the bar for the above-described adjustment of the stationary cutter.

The clutch-gearing which I use for connecting the rotary cutter-shaft with one or both of the wheels B B as drive-wheels is constructed as follows: On the shaft, just outside of its bearing on a frame-plate A, is a radial stud I, having its rear side with reference to the forward rotation of the shaft, formed with the surface $i$ inclined forwardly and inwardly toward the frame-plate. The outer side of the stud is substantially flat and stands in a plane at right angles to the shaft-axis. On the shaft end, outside of this stud, is the pinion I', having its teeth $i'$ $i'$ meshing with the gear-teeth $b\,b$ on the drive-wheel B. On its side toward the stud I this pinion has one or more ratchet-shaped projections $i^2$, each having its incline extending forward and inward toward the stud and its abrupt face undercut or provided with an inclined face $i^3$, substantially parallel with the inclined surface $i$ on the stud. The projections thus formed constitute hooks whose outer sides are cams to engage the stud and force the pinion away from the latter as it turns back on the shaft, and whose undercut forward sides are adapted to engage the incline on the rear side of the shaft-stud as the pinion is turned forward and cause the pinion to be drawn inward along the shaft toward the stud until the latter is seated securely in the hook of the pinion projection. As long as the pinion is turned forward it and the shaft will then be securely coupled or clutched together, and there is no chance of movement of the pinion outward to disengage its hook from the stud. When backward rotation of the pinion takes place, the hook on the pinion projection passes out of engagement with the shaft-stud and the pinion is cammed longitudinally away from the latter by the engagement therewith of one of the cam-inclines on the outer side of the ratchet-shaped projections.

For forcing the pinion inward toward the shaft-stud when the drive-wheel is rotated, so as to give the pinion its forward rotation, I provide the drive-wheel teeth $b\ b$ with inclines $b'\ b'$, adapted to engage the outer ends of the pinion-teeth when the pinion is in its outward position on the shaft. These inclines or tooth-engaging cams are of such extent only as to engage the pinion-teeth ends, while the pinion is in such position that the hooks on its projections cannot engage the stud I on the shaft. When the pinion has been moved inward along the shaft and is clutched thereto, as described above, the cams $b'\ b'$ are out of engagement with the pinion-teeth, so that the contacting surfaces of the latter and the drive-wheel teeth can be squarely in contact, as in the case of ordinary intermeshing gears. During the first forward movement of the drive-wheel said cams $b'\ b'$ act, as set forth, to cam the pinion toward the shaft-stud, and then the undercut surfaces or hooks on the pinion projections engaging the incline $i$ on the stud complete the movement of the pinion and take its teeth clear of the cams. Obviously the same operation and result could be obtained if the arrangement described and shown were simply reversed and the cams $b'\ b'$, with outwardly and forwardly extending inclined surfaces were placed at the rear sides of the inner ends of the pinion-teeth, as shown by dotted lines in Fig. 4. Such arrangement and construction I regard as entirely within the scope of and involving no departure from my invention. The result arrived at—viz., the camming of the pinion toward the stud—is the same and is secured in substantially the same manner, whether the drive-wheel has inclines on its teeth to engage the pinion-teeth or the pinion has the cams to engage the ends of the wheel-teeth.

In my mower, made as shown and described, the ends of the cross-bar E can be secured to or detached from the side frame-plates A A without the necessity of removing the fastening-bolts from the holes in the plates or even taking the nuts from the bolts. With the nuts loosened the bar ends can be dropped into place between the ribs $a\ a'\ a'$ and lugs $a^2$ on the plates, with the bolts entering the slots $e^3\ e^3$ in the bar end plates $e^2\ e^2$. Upon tightening up the nuts, the bolts will then seat the bar ends firmly between said ribs and lugs, so that they cannot have any motion whatever with reference to the frame-plates. By also using the open-ended slots instead of holes in the frame-plates to receive the fastening-bolts for the rotary-shaft journal-box caps and the ends of the stationary cutter-bar I make it possible to attach such caps and bar ends to and detach them from the frame-plates without removal of the bolts from the caps or bar or the nuts from the bolts.

The whole frame of my mower, while being capable of ready assembling, adjustment, and taking apart, is simple and strong, and, being so made that no drilling and tapping of bolts or screw-holes, or any machine-work is necessary upon it, is cheap.

The construction and operation of the clutch-gearing for driving the rotary cutter-shaft have been described fully hereinbefore and need not be set forth further.

The longitudinal movement of the pinion on the shaft and with reference to the drive-wheel as the latter is turned in one direction and then the other I find to be very advantageous, in that it keeps the pinion loose and free to turn on the shaft and prevents it getting stuck or fastened upon the latter by any dirt, grit, or rust, and also prevents the collection of clogging material upon the contacting surfaces of the pinion and gear teeth. As while the drive-wheel is turned back the pinion remains at the outer end of its movement on the shaft, there is no noise, as such is produced where the ordinary form of backing ratchet or clutch is used, by the riding of a pawl over ratchet-teeth. As the drive-wheel starts forward again the pinion is by the cams $b'\ b'$, engaging its teeth ends, cammed at once toward the shaft-stud, so that one of the hooks of the pinion projections will engage the same and draw the pinion farther along to take its teeth out of the path of the cams, where they can squarely engage the drive-wheel teeth, as described.

While I have shown and described my backing-clutch mechanism as applied to a lawn-mower, it is adapted to be used also to advantage in any other form of machine where an automatic clutch is required to connect and disconnect a driving-gear and a shaft as such gear is turned forward and backward, respectively.

Having thus described my invention, what I claim is—

1. In a lawn-mower, in combination with the side frame-plates, the bolts therein and nuts on the bolts, the cross-bar having the portions at right angles to its body provided with open-ended slots, and ribs on the side frame-plates engaging the bar ends at points opposite the open ends of the slots, substantially as and for the purpose shown.

2. In a lawn-mower, in combination with the side frame-plates, the cross-bar having the upright side flanges and the horizontal web connecting the same, ribs on the frame-plates to engage the upper side of the web between the flanges, ribs to engage the flanges themselves, and means for securing the bar ends against the frame-plates, said ends being provided with open-ended slots with which the fastening means co-operate, substantially as and for the purpose specified.

3. In a lawn-mower, in combination with the side frame-plates and the bolts with nuts thereon, the cross-bar having the upright flanges connected by the horizontal web and the downwardly-extending slotted portions at right angles to the web, ribs on the frame-plates engaging, respectively, the bar-web between the flanges and flanges themselves, and suitable studs or projections on the plates adapted to engage portions of the bar, so as to prevent movement of the bar-web away from the plate-ribs engaging it, substantially as and for the purpose shown.

4. In a lawn-mower, in combination with the frame side provided with an outwardly-extended portion having an open-ended slot, the stationary cutter-bar having at its end an elongated bolt-hole, the bolt passing through the latter and said slot, and the nut on the bolt, substantially as and for the purpose shown.

5. In a lawn-mower, in combination with the frame sides, each having an outwardly-extended lug, a groove, and two open-ended slots in the lug to the front and rear of the groove, the stationary cutter-bar having ribs on its ends to engage the grooves in the frame sides, and elongated bolt-holes to the front and rear of each rib, the bolts passing through the holes and the open-ended slots, and the nuts on the bolts, substantially as and for the purpose set forth.

6. In combination with a rotary shaft provided with a stud, intermeshing gears, one of which is loosely journaled on the shaft, one or more projections on the side of such gear toward the stud, each having an inclined and an abrupt face, with the latter facing forward, so as to engage the shaft-stud as the gear is turned in that direction, and inclines on one of the gears adapted to engage the teeth of the other, so that the gear on the shaft is cammed toward the shaft-stud as the gearing is turned forward, substantially as and for the purpose specified.

7. In combination with a rotary shaft provided with a stud, intermeshing gears, the one loosely journaled on the shaft and provided with one or more projections on its side toward the shaft-stud, each having an inclined surface, and a surface to engage the shaft-stud, so as to cause the gear and shaft to turn together, and the other gear having on the outer portions of its teeth inclines to engage the ends of the teeth on the other gear, substantially as and for the purpose shown.

8. In combination with the rotary shaft provided with a stud, the pinion loosely journaled on the shaft, having ratchet-shaped projections on its side toward the stud, and the drive-wheel having teeth meshing with those of the pinion and provided with inclines to engage the teeth of the pinion on the outer side of the latter, so as to force the pinion along the shaft toward the stud, substantially as and for the purpose set forth.

9. In combination with the rotary shaft having the stud and the pinion loosely journaled thereon and provided on the side toward the stud with ratchet-shaped projections having their abrupt ends undercut and provided with inclined stud-engaging surfaces, and the driving-gear meshing with the pinion, having on the forward side of its teeth cams to engage the pinion-teeth, so as to cam the latter inward toward the shaft-stud, substantially as and for the purpose described.

10. In combination with the rotary shaft and the stud thereon having the inclined face, the pinion loosely journaled on the shaft, having on the side toward the shaft-stud hooked ratchet-shaped projections, and the driving-gear meshing with the pinion, having on the forward sides of the outer portions or ends of its teeth forwardly and outwardly extending inclines to engage the outer ends of the teeth of the pinion when the latter is moved out away from the stud on the shaft, substantially as and for the purpose specified.

In testimony that I claim the foregoing I have hereunto set my hand this 14th day of March, A. D. 1890.

HENRY H. DILLE.

Witnesses:
CARVER J. MENDENHALL,
WILBERN K. BRADBURY.